US011174736B2

(12) United States Patent
Osgood et al.

(10) Patent No.: US 11,174,736 B2
(45) Date of Patent: Nov. 16, 2021

(54) METHOD OF FORMING AN ADDITIVELY MANUFACTURED COMPONENT

(71) Applicant: GENERAL ELECTRIC COMPANY, Schenectady, NY (US)

(72) Inventors: Daniel Endecott Osgood, Cincinnati, OH (US); Zachary Daniel Webster, Cincinnati, OH (US); Gregory Terrence Garay, West Chester, OH (US); Tingfan Pang, West Chester, OH (US); Kirk D. Gallier, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 183 days.

(21) Appl. No.: 16/224,065

(22) Filed: Dec. 18, 2018

(65) Prior Publication Data

US 2020/0190988 A1    Jun. 18, 2020

(51) Int. Cl.
| F01D 5/18 | (2006.01) |
| F01D 5/14 | (2006.01) |
| F01D 5/30 | (2006.01) |
| B22F 10/20 | (2021.01) |
| B33Y 10/00 | (2015.01) |
| B33Y 80/00 | (2015.01) |
| B22F 10/30 | (2021.01) |

(52) U.S. Cl.
CPC .............. *F01D 5/186* (2013.01); *B22F 10/20* (2021.01); *F01D 5/147* (2013.01); *F01D 5/3007* (2013.01); *B22F 10/30* (2021.01);
*B33Y 10/00* (2014.12); *B33Y 80/00* (2014.12); *F05D 2230/31* (2013.01); *F05D 2240/304* (2013.01); *F05D 2260/202* (2013.01)

(58) Field of Classification Search
CPC ........ F01D 5/186; F01D 5/147; F01D 5/3007; B22F 3/1055; B22F 2003/1057; F05D 2230/31; F05D 2260/202; F05D 2240/304; B33Y 10/00; B33Y 80/00; B29C 64/40
See application file for complete search history.

(56) References Cited

U.S. PATENT DOCUMENTS

| 4,142,824 A | 3/1979 | Anderson |
| 4,203,706 A | 5/1980 | Hess |
| 4,487,550 A | 12/1984 | Horvath et al. |
| 4,505,639 A | 3/1985 | Groess et al. |
| 4,669,957 A | 6/1987 | Phillips et al. |
| 4,672,727 A | 6/1987 | Field |
| 4,726,735 A | 2/1988 | Field et al. |
| 4,859,147 A | 8/1989 | Hall et al. |

(Continued)

FOREIGN PATENT DOCUMENTS

| EP | 3124745 A1 | 2/2017 |
| EP | 3124746 A1 | 2/2017 |

(Continued)

*Primary Examiner* — Moshe Wilensky
(74) *Attorney, Agent, or Firm* — McGarry Bair PC (57) ABSTRACT

Aspects generally relate to a method of forming a plexus within an additively-manufactured component. The method includes forming a fluid passage in the plexus by serially forming layers of material along a build direction to form a column defining the fluid passage along a first direction within an interior of a turbine engine component.

15 Claims, 10 Drawing Sheets

(56) References Cited

U.S. PATENT DOCUMENTS

| | | |
|---|---|---|
| 5,223,320 A | 6/1993 | Richardson |
| 5,356,265 A | 10/1994 | Kercher |
| 5,383,766 A | 1/1995 | Przirembel et al. |
| 5,387,085 A | 2/1995 | Thomas, Jr. et al. |
| 5,392,515 A | 2/1995 | Auxier et al. |
| 5,405,242 A | 4/1995 | Auxier et al. |
| 5,486,093 A | 1/1996 | Auxier et al. |
| 5,503,529 A | 4/1996 | Anselmi et al. |
| 5,660,523 A | 8/1997 | Lee |
| 5,667,359 A | 9/1997 | Huber et al. |
| 5,702,232 A | 12/1997 | Moore |
| 5,720,431 A | 2/1998 | Sellers et al. |
| 5,931,638 A | 8/1999 | Krause et al. |
| 6,086,328 A | 7/2000 | Lee |
| 6,099,251 A | 8/2000 | LaFleur |
| 6,241,468 B1 | 6/2001 | Lock et al. |
| 6,254,334 B1 | 7/2001 | LaFleur |
| 6,379,118 B2 | 4/2002 | Lutum et al. |
| 6,402,470 B1 | 6/2002 | Kvasnak et al. |
| 6,402,471 B1 | 6/2002 | Demers et al. |
| 6,478,537 B2 | 11/2002 | Junkin |
| 6,551,062 B2 | 1/2003 | Leeke et al. |
| 6,773,231 B2 | 8/2004 | Bunker et al. |
| 6,790,005 B2 | 9/2004 | Lee et al. |
| 6,832,889 B1 | 12/2004 | Lee et al. |
| 6,869,270 B2 | 3/2005 | Bunker et al. |
| 6,994,514 B2 | 2/2006 | Soechting et al. |
| 7,121,787 B2 | 10/2006 | Jacks et al. |
| 7,255,534 B2 | 8/2007 | Liang |
| 7,334,412 B2 | 2/2008 | Tiemann |
| 7,364,405 B2 | 4/2008 | Cunha et al. |
| 7,467,922 B2 | 12/2008 | Beeck et al. |
| 7,497,660 B2 | 3/2009 | Liang |
| 7,563,072 B1 | 7/2009 | Liang |
| 7,632,062 B2 | 12/2009 | Harvey et al. |
| 7,665,956 B2 | 2/2010 | Mitchell et al. |
| 7,686,580 B2 | 3/2010 | Cunha et al. |
| 7,686,582 B2 | 3/2010 | Cunha |
| 7,785,071 B1 | 8/2010 | Liang |
| 7,789,626 B1 | 9/2010 | Liang |
| 7,815,414 B2 | 10/2010 | Devore et al. |
| 8,043,058 B1 | 10/2011 | Liang |
| 8,057,182 B2 | 11/2011 | Brittingham et al. |
| 8,066,485 B1 | 11/2011 | Liang |
| 8,079,812 B2 | 12/2011 | Okita |
| 8,092,176 B2 | 1/2012 | Liang |
| 8,105,030 B2 | 1/2012 | Abdel-Messeh et al. |
| 8,109,726 B2 | 2/2012 | Liang |
| 8,172,534 B2 | 5/2012 | Ammann et al. |
| 8,262,357 B2 | 9/2012 | Mhetras |
| 8,313,287 B2 | 11/2012 | Little |
| 8,317,476 B1 | 11/2012 | Liang |
| 8,454,310 B1 | 6/2013 | Downs |
| 8,469,666 B1 | 6/2013 | Liang |
| 8,647,053 B2 | 2/2014 | Hsu et al. |
| 8,651,805 B2 | 2/2014 | Lacy et al. |
| 8,714,926 B2 | 5/2014 | Lee et al. |
| 8,840,363 B2 | 9/2014 | Lee |
| 8,851,848 B1 | 10/2014 | Liang |
| 8,864,469 B1 | 10/2014 | Liang |
| 9,133,715 B2 | 9/2015 | Lutjen et al. |
| 9,151,175 B2 | 10/2015 | Tham et al. |
| 9,234,438 B2 | 1/2016 | Lee |
| 9,249,670 B2 | 2/2016 | Bunker |
| 9,260,972 B2 | 2/2016 | Zelesky et al. |
| 9,273,561 B2 | 3/2016 | Lacy et al. |
| 9,279,330 B2 | 3/2016 | Xu et al. |
| 9,297,262 B2 | 3/2016 | Zhang et al. |
| 9,366,143 B2 | 6/2016 | Lee et al. |
| 9,394,796 B2 | 7/2016 | Lacy et al. |
| 9,447,692 B1 | 9/2016 | Liang |
| 9,470,095 B2 | 10/2016 | Propheter-Hinckley et al. |
| 9,605,545 B2 | 3/2017 | Grohens et al. |
| 9,670,782 B2 | 6/2017 | Gohler et al. |
| 9,777,577 B2 | 10/2017 | Brandl et al. |
| 9,777,582 B2 | 10/2017 | Zelesky et al. |
| 9,840,927 B2 | 12/2017 | Tucker |
| 9,840,930 B2 | 12/2017 | Lee et al. |
| 9,856,739 B2 | 1/2018 | Bedrosyan et al. |
| 9,879,601 B2 | 1/2018 | Vandervaart et al. |
| 9,890,644 B2 | 2/2018 | Tran et al. |
| 9,896,942 B2 | 2/2018 | Shepherd |
| 9,896,954 B2 | 2/2018 | Walston et al. |
| 9,938,899 B2 | 4/2018 | Miranda et al. |
| 9,957,817 B2 | 5/2018 | Zelesky et al. |
| 9,982,541 B2 | 5/2018 | Kwon et al. |
| 2006/0002788 A1 | 1/2006 | Liang |
| 2014/0033736 A1 | 2/2014 | Propheter-Hinckley et al. |
| 2015/0345298 A1 | 12/2015 | Mongillo et al. |
| 2015/0345304 A1 | 12/2015 | Mongillo et al. |
| 2016/0076552 A1 | 3/2016 | Anderson et al. |
| 2016/0169003 A1 | 6/2016 | Wong et al. |
| 2016/0237828 A1 | 8/2016 | Burd |
| 2017/0007824 A1 | 1/2017 | Gardner et al. |
| 2017/0008086 A1* | 1/2017 | Jones ............... B22F 5/009 |
| 2017/0030198 A1 | 2/2017 | Kruckels et al. |
| 2017/0234134 A1 | 8/2017 | Bunker |
| 2017/0298823 A1 | 10/2017 | Harding |
| 2017/0306746 A1 | 10/2017 | Konitzer et al. |
| 2018/0058226 A1 | 3/2018 | Tucker et al. |
| 2018/0128115 A1 | 5/2018 | Hudson et al. |
| 2018/0135423 A1 | 5/2018 | Dyson et al. |
| 2018/0156045 A1 | 6/2018 | Glum et al. |
| 2018/0171872 A1 | 6/2018 | Dyson et al. |
| 2018/0179956 A1 | 6/2018 | Wertz |
| 2018/0202296 A1 | 7/2018 | Kiener et al. |
| 2018/0230832 A1 | 8/2018 | Dierksmeier |
| 2019/0275779 A1* | 9/2019 | Tanigawa ............... B24C 1/006 |

FOREIGN PATENT DOCUMENTS

| | | |
|---|---|---|
| JP | 2009221995 A | 10/2009 |
| WO | 2018093627 A3 | 5/2018 |

\* cited by examiner

METHOD OF FORMING AN ADDITIVELY MANUFACTURED COMPONENT

BACKGROUND

Additive manufacturing processes or systems can be used to print or build three-dimensional parts or components from digital models, which can be beneficial for rapid prototyping and manufacturing. During manufacture of the component, support structures can be included within the part to provide added rigidity for partially-formed portions, especially formations that are at a right angle to the build direction. Such right-angle formations are subject to gravitational forces during the building process, where layers of material are sequentially formed.

BRIEF DESCRIPTION

In one aspect, the disclosure relates to a method of forming a plexus within an additively-manufactured component. The method includes forming a first fluid passage in the plexus by serially adding layers of material along a build direction to form a column defining the first fluid passage along a first direction within an interior of a turbine engine component, the first direction being parallel to the build direction, and forming a second fluid passage in the plexus by serially adding layers of material along the build direction to form an overhang intersecting the column and defining the second fluid passage along a second direction within the interior.

In another aspect, the disclosure relates to a method of forming a plexus within an additively-manufactured turbine engine component. The method includes forming a first fluid passage in the plexus by serially forming layers of material along a build direction to form a column defining a first fluid passage along a first direction within an interior of the turbine engine component, and forming a second fluid passage in the plexus by serially forming layers of material along the build direction to form an overhang defining the second fluid passage along a second direction within the interior, the second direction being unaligned with the first direction.

DETAILED DESCRIPTION

The described embodiments of the present disclosure are directed to a method of forming an additively-manufactured component. As used herein, an "additively manufactured" component will refer to a component formed by an additive manufacturing (AM) process, wherein the component is built layer-by-layer by successive deposition of material. AM is an appropriate name to describe the technologies that build 3D objects by adding layer-upon-layer of material, whether the material is plastic, metal, composite, or other. AM technologies can utilize a computer, 3D modeling software (Computer Aided Design or CAD), machine equipment, and layering material. Once a CAD sketch is produced, the AM equipment can read in data from the CAD file and lay down or add successive layers of liquid, powder, sheet material or other material, in a layer-upon-layer fashion to fabricate a 3D object. It should be understood that the term "additive manufacturing" encompasses many technologies including subsets like 3D Printing, Rapid Prototyping (RP), Direct Digital Manufacturing (DDM), layered manufacturing and additive fabrication. Non-limiting examples of additive manufacturing that can be utilized to form an additively-manufactured component include powder bed fusion, vat photopolymerization, binder jetting, material extrusion, directed energy deposition, material jetting, sheet lamination, or ceramic layering or stacking.

Additively-manufactured components are often built along a preselected build direction which is chosen to minimize stresses within the component during the build process. Components with laterally-protruding features respect to the build direction can experience internal stresses during manufacture, which can cause undesirable warping of the component.

For the purposes of illustration, the disclosure will be described in the context of a cooled component such as a cooled airfoil within a turbine engine. It will be understood that the disclosure may have general applicability within an engine, including turbines and compressors and non-airfoil engine components, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component.

As used herein, "a set" can include any number of the respectively described elements, including only one element. Additionally, the terms "radial" or "radially" as used herein refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of the disclosure. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Figure 1:
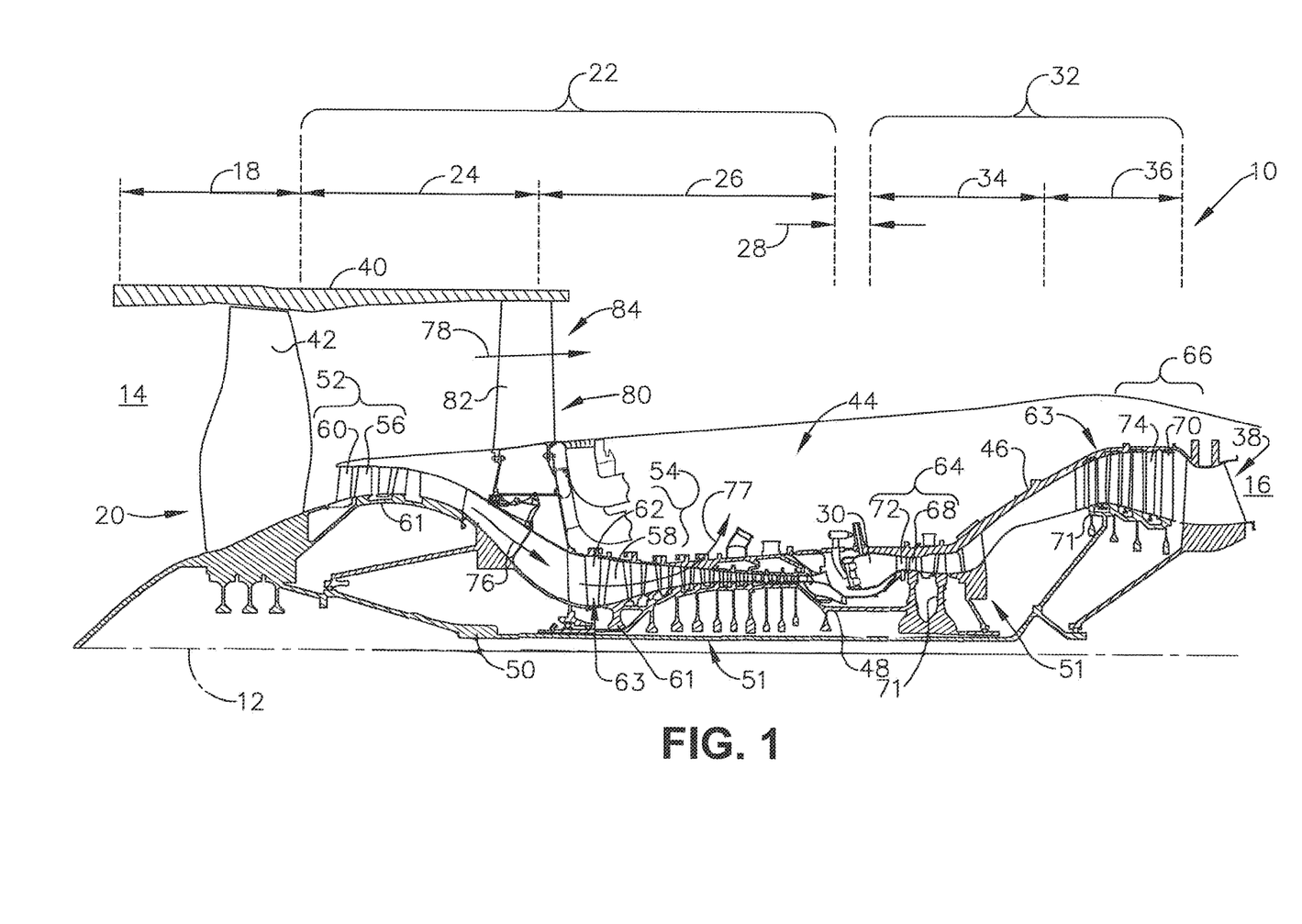
FIG. 1 is a schematic cross-sectional diagram of a turbine engine for an aircraft including an additively-manufactured component according to various aspects described herein.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to (or integral to) a disk 61, which is mounted to the corresponding one of the HP and LP spools 48, 50. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12 while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
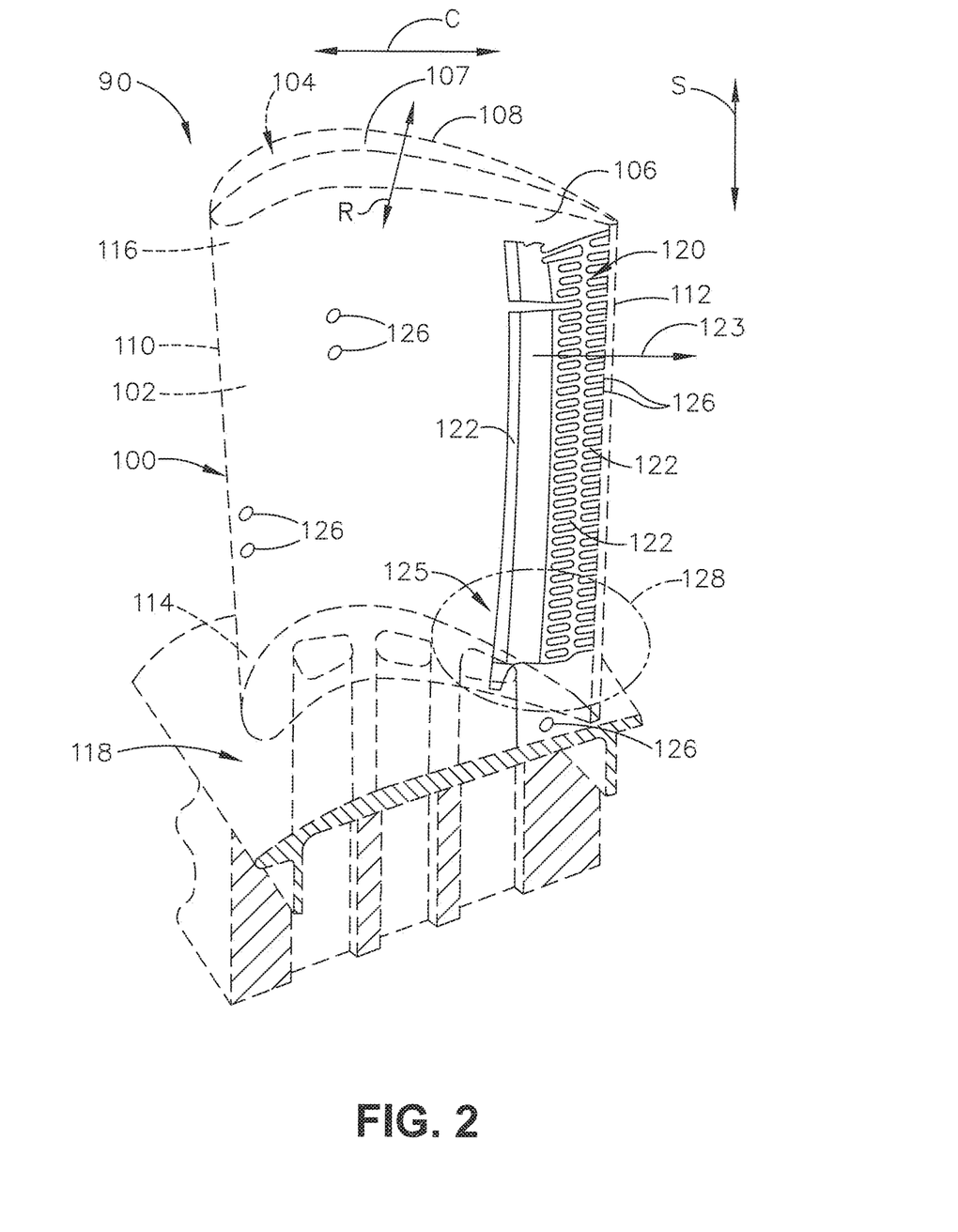
FIG. 2 is a perspective view of the additively manufactured component of FIG. 1 in the form of an airfoil including an exemplary plexus of cooling passages.

Referring now to FIG. 2, an additively-manufactured engine component in the form of an airfoil assembly 90 is shown that can be utilized in the turbine engine 10 of FIG. 1. The airfoil assembly 90 includes an airfoil 100 that can be any airfoil such as a blade or vane in the fan section 18, compressor section 22 or turbine section 32 as desired.

The airfoil 100 includes an outer wall 102 (shown in phantom line) defining an exterior surface 103 and bounding an interior 104. The outer wall 102 defines a pressure side 106 and a suction side 108 and extends axially between a leading edge 110 and a trailing edge 112 to define a chord-wise direction C (see FIG. 3), and also extends radially between a root 114 and a tip 116 to define a span-wise direction S. In addition, a cross-wise direction R perpendicular to the chord-wise direction C can be defined between the pressure side 106 and suction side 108 as shown.

The airfoil 100 is illustrated as a blade extending from a dovetail 118 (in phantom line) coupled to the root 114 as shown. The dovetail 118 can be configured to mount to the turbine rotor disk 71 on the engine 10. The dovetail 118 comprises at least one inlet passage 119, exemplarily shown as three inlet passages 119, each extending through the dovetail 118 to provide internal fluid communication with the airfoil 100. It should be appreciated that the dovetail 118 is shown in cross-section, such that the inlet passages 119 are housed within the body of the dovetail 118. In an alternate example, the airfoil 100 can be a vane extending in the span-wise direction between an inner band and outer band (not shown).

The airfoil 100 further includes a three-dimensional plexus 120 (also referred to herein as "plexus 120") of fluidly interconnected cooling passages 122 (shown in solid line, and representing open spaces or voids inside of the airfoil 100). The plexus 120 of cooling passages 122 can be formed within the airfoil 100 using a variety of methods, including additive manufacturing, casting, electroforming, or direct metal laser melting, in non-limiting examples.

The plexus 120 can extend between at least one inlet 124 fluidly coupled to a source of cooling air within the airfoil interior 104, such as the at least one inlet passage 119, and at least cooling hole or outlet 126 fluidly coupled to the outer wall. The inlet 124 can include a slot, hole, or combination as desired. It is contemplated that the inlet 124 can receive cooling fluid from any desired location within the airfoil assembly 90, such as an interior passage of the dovetail 118, or a central plenum or supply passage (not shown) within the airfoil interior 104. The outlets 126 can include in-line diffusers, diffusing slots, film holes, ejection holes, channels, and the like, or combinations thereof. The outlets 126 can be located at any suitable location including the leading edge 110, root 114, tip 116, or elsewhere along the pressure side 106 or suction side 108. Outlets 126 can also be formed in other portions of the airfoil assembly 90, such as the dovetail 118, and fluidly coupled to the plexus 120.

It is contemplated that the plexus 120 can extend in at least two dimensions, including the span-wise direction S, the chord-wise direction C, or the cross-wise direction R. For example, the plexus 120 can have an overall profile or form similar to that of a vein plexus or network in a body. The plexus 120 can include multiple intersections between the fluidly interconnected cooling passages 122. It should also be understood that the plexus 120 can have multiple geometric profiles, branches, or intersections. The three-dimensional plexus 120 with multiple interconnected cooling passages 122 can be utilized for tailoring a supply of cooling air to a variety of locations within the interior or exterior of the airfoil 100.

Figure 3:
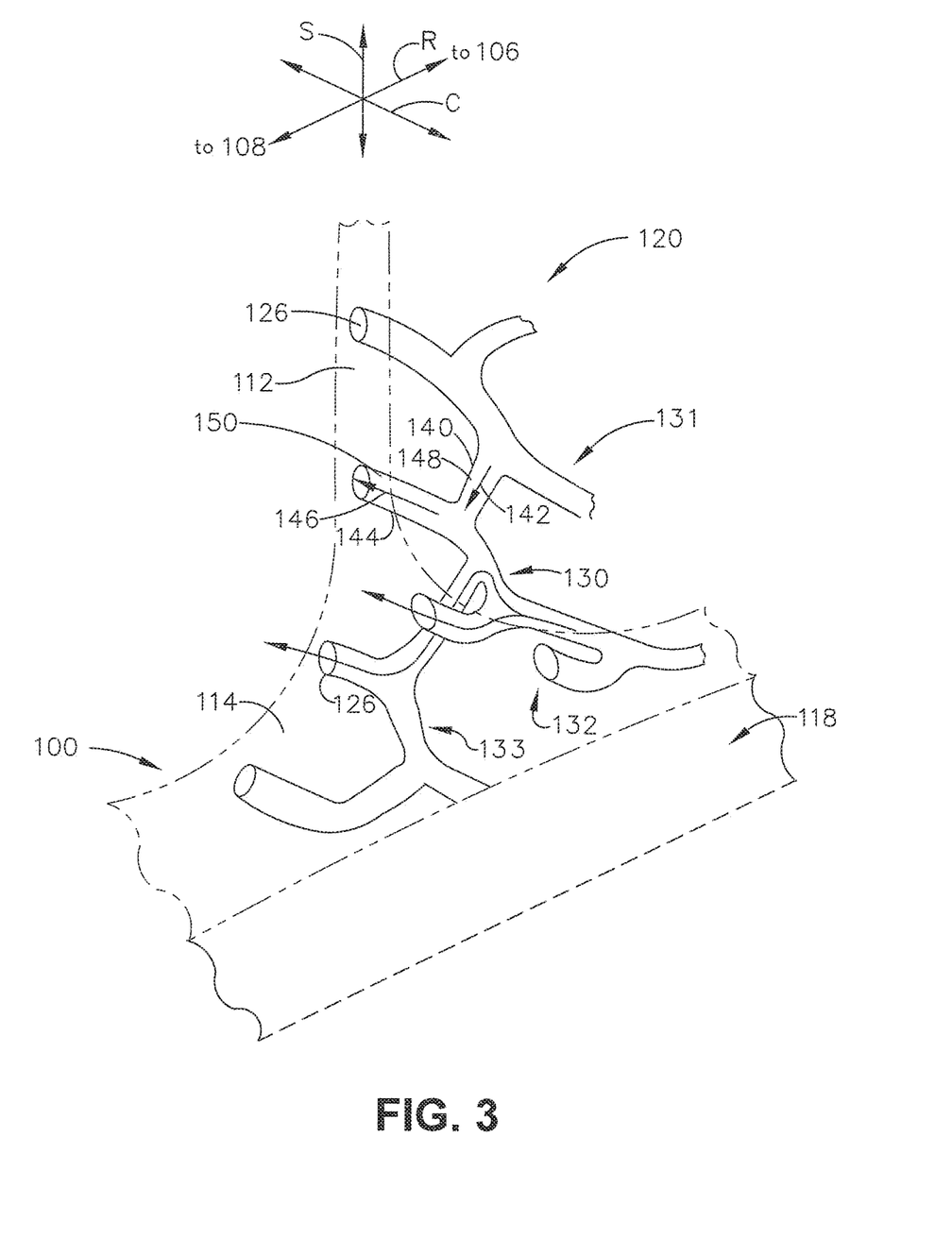
FIG. 3 is a perspective view of a portion of the airfoil and plexus of FIG. 2.

Referring now to FIG. 3, a portion 128 (FIG. 2) of the plexus 120 of cooling passages is shown along the trailing edge 112. The chord-wise direction C, span-wise direction S, and cross-wise direction R are illustrated for reference. In an example where the airfoil 100 comprises a blade, the root 114 is adjacent the dovetail 118 coupled to the blade. In an alternate example wherein the airfoil 100 comprises a vane, the root 114 can be adjacent an inner band or outer band coupled to the vane.

An intersection 130 can be located at the root 114 of the airfoil 100. The intersection 130 can fluidly couple a first set 131 of cooling passages along the span-wise direction S to a second set 132 and a third set 133 of cooling passages. The second set 132 branches from the intersection 130 toward the pressure side 106, and the third set 133 branches from the intersection 130 toward the suction side 108. Arrows illustrate cooling air flowing through the plexus 120 and exiting via the outlets 126. In this manner, the three-dimensional plexus 120 of fluidly interconnected cooling passages 122 can extend in first, second, and third directions, such as the chord-wise direction C, the span-wise direction S, or the cross-wise direction R and be fluidly coupled to outlets 126 on an exterior surface 103 of the airfoil 100 (FIG. 2).

A column 140 can define a first fluid passage 148 along a first direction 142 in the plexus 120. An overhang 144 can define a second fluid passage 146 along a second direction 146 in the plexus 120. The overhang 144 can intersect and be unitarily formed with the column 140 such that the first and second fluid passages 148, 150 can be fluidly coupled in the plexus 120. The first and second directions 142, 146 can be along any or all of the chord-wise direction C, the span-wise direction S, or the cross-wise direction R, or any combination thereof. In addition, the first direction 142 can be unaligned with the second direction 146 to form any suitable angle therebetween, including less than 20 degrees, or up to and including 90 degrees, in non-limiting examples. In the illustrated example, the first direction 142 is shown as being perpendicular to the second direction 146.

It is contemplated that the first and second fluid passages 148, 150 can be formed simultaneously, i.e. along a single pass in the build direction 175. Alternately, the first and second fluid passages 148, 150 can be formed or built up individually. The first and second fluid passages 148, 150 can be formed along unaligned first and second directions 142, 146, including being formed simultaneously or individually within the plexus 120. In still another example, the first and second fluid passages 148, 150 can be defined by a solid core, such as by additive manufacture of a ceramic core in one non-limiting example, wherein forming a metal layer over the solid core in a casting process and removing the solid core can create a hollow column or overhang with the first or second fluid passage 148, 150.

Figure 4:
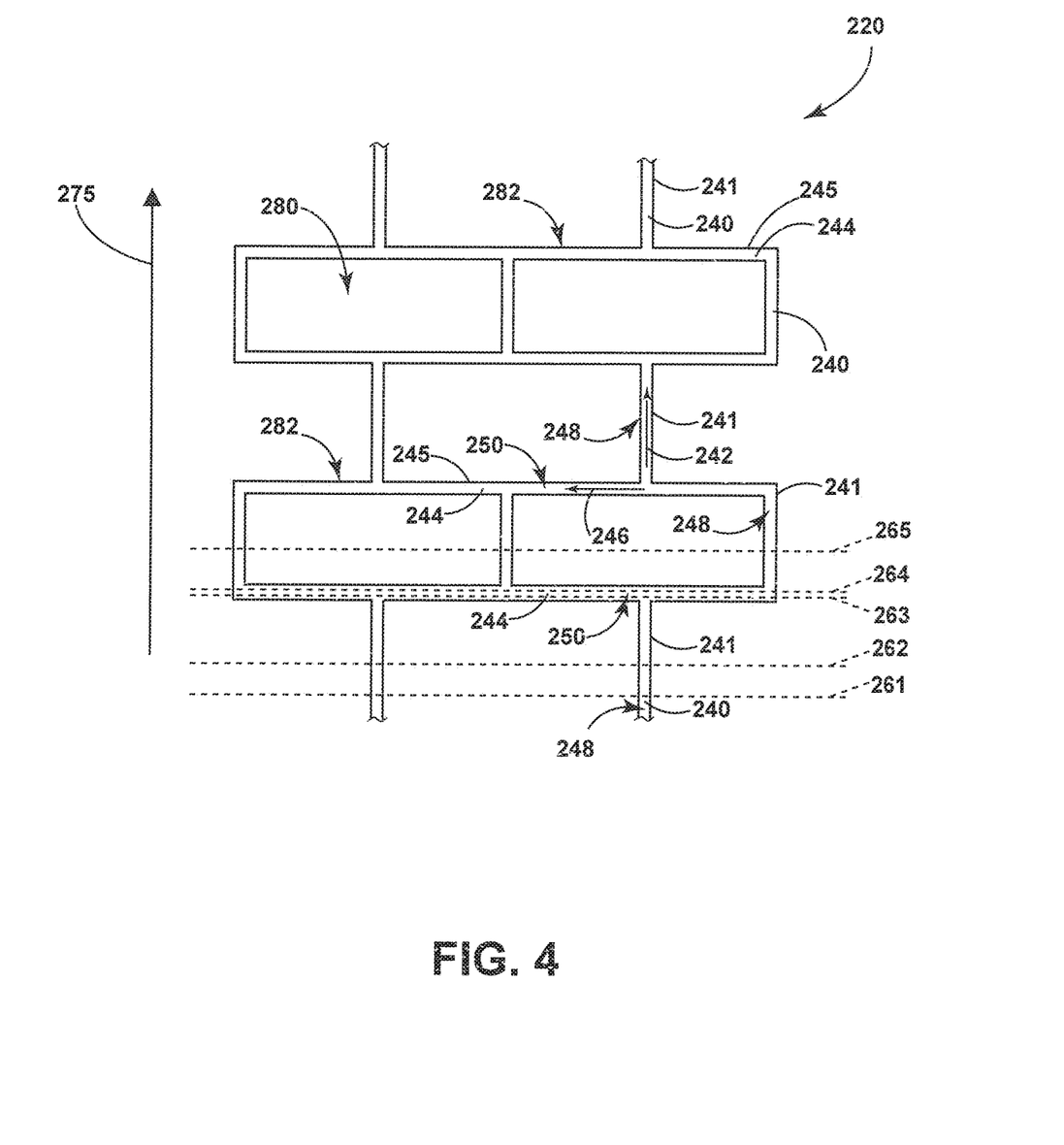
FIG. 4 is a cross-sectional front view of a plexus with a rectangular geometric profile that can be utilized in the turbine engine component of FIG. 1.

Turning to FIG. 4, a plexus 220 is schematically illustrated that can be utilized in the airfoil 100, where the airfoil 100 is omitted for clarity. The plexus 220 is similar to the plexus 120; therefore, like parts will be identified with like numerals increased by 100, with it being understood that the description of the like parts of the plexus 120 applies to the plexus 220, except where noted.

It should be understood that although illustrated with "flat" passages, the plexus 220 represents a three-dimensional void within the airfoil 100 (FIG. 3). A column 240 having a hollow column wall 241 can define a first fluid passage 248 extending along a first direction 242. An overhang 244 with a hollow overhang wall 245 can define a second fluid passage 250 extending along a second direction 246. The first and second fluid passages 248, 250 can be fluidly coupled in the plexus 220. In the illustrated example, the second direction 246 is perpendicular to the first direction 242.

The plexus 220 can be formed by additive manufacturing, including by serially printing, fusing, or stacking of material to form layers. A build direction 275 is shown in a direction parallel to the first direction 242. In one non-limiting example, the build direction 275 can be aligned with the span-wise direction S (FIG. 2). The plexus 220 can be formed by serially forming layers of material along the build direction 275. A first layer 261 and second layer 262 illustrate that the columns 241 can be built up and formed to define the first fluid passages 248. For clarity, the first and second layers 261, 262 are shown with exaggerated thicknesses, and the second layer 262 is shown as being spaced apart from the first layer 261. It should be understood that the layers 261, 262 can have any suitable thickness, and that the second layer 262 can be formed directly onto the first layer 261 such that multiple layers are built up to form the columns 240. A third layer 263 and fourth layer 264 illustrate that the overhangs 245 can be built up in the same build direction 275, supported by the columns 241, to define the corresponding second fluid passages 250. A fifth layer 265 illustrates that additional columns 240 can be built over at least one overhang 244. In this manner, the overhangs 244 and columns 240 can be serially built over multiple layers to form the plexus 220 within an additively-manufactured component such as the airfoil 100.

The fluid passages 248, 250 can define or form a geometric profile 280 within the plexus 220. In one example, the geometric profile 280 can be identical throughout the entire plexus 220. Alternately, the geometric profile 280 can vary in different regions of the plexus 220. In the illustrated example, the geometric profile 280 is rectangular. In such a case, the overhangs 244 can be formed as lines over multiple layers (e.g. as shown by the third and fourth layers 263, 264), wherein the multiple fluid passages 248, 250 are arranged in rows 282. For example, the rows 282 can be orthogonal to the build direction 275. It is also contemplated that fluid passages 248, 250 of adjacent rows 282 can be transversely offset, which can improve structural stability of the plexus 220 within the airfoil 100 (FIG. 3).

Figure 5:
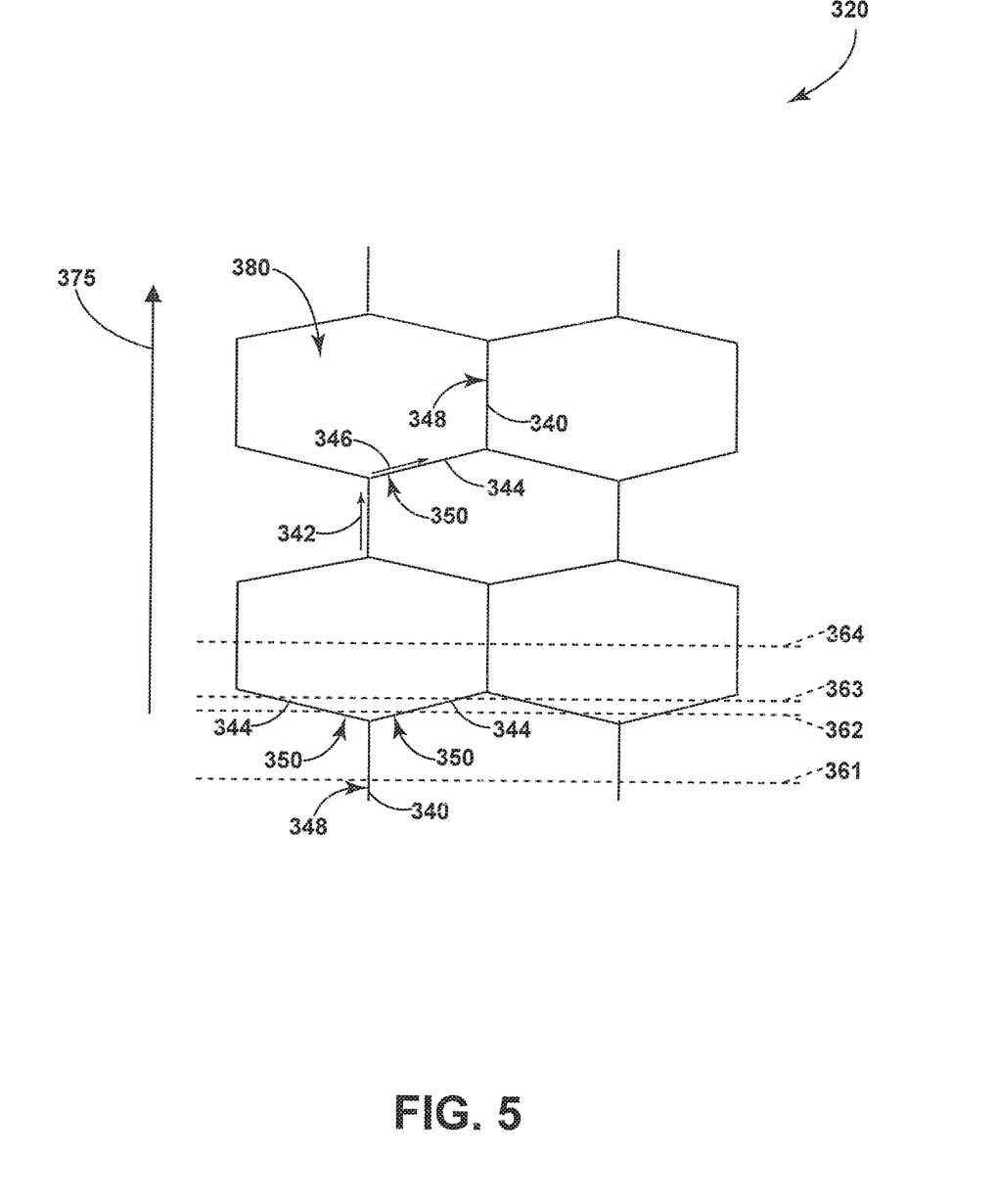
FIG. 5 is a schematic front view of another plexus with a polygonal geometric profile that can be utilized in the turbine engine component of FIG. 1.

Referring now to FIG. 5, another plexus 320 is schematically illustrated that can be utilized in the airfoil 100, where the airfoil 100 is omitted for clarity. The plexus 320 is similar to the plexus 120, 220; therefore, like parts will be identified with like numerals further increased by 100, with it being understood that the description of the like parts of the plexus 120, 220 applies to the plexus 320, except where noted.

It should be understood that although illustrated with lines representing fluid passages, the plexus 320 represents a three-dimensional void within the airfoil 100 (FIG. 3). A column 340 defines a first fluid passage 348 extending along a first direction 342 which is parallel to a build direction 375. An overhang 344 defines a second fluid passage 350 extending along a second direction 346. One difference is that the second direction 346 is non-orthogonal to the first direction 342.

Another difference is that the fluid passages 348, 350 can define a polygonal geometric profile 380 that is polygonal. The polygonal geometric profile 380 is illustrated as hexagonal in a non-limiting example. It is contemplated that multiple overhangs 344 can fluidly couple between adjacent columns 340 to form the geometric profile 380.

The overhangs 344 can be built as a line over multiple layers, illustrated with a first layer 361, a second layer 362, a third layer 363, and a fourth layer 364 built up in the build direction 375. Another difference is that the overhangs 344 can be built up at a non-orthogonal angle to the build direction 375. It can be appreciated that a benefit of the polygonal geometric profile 380 is that internal stresses within the overhangs 344 can be reduced due to its non-orthogonal orientation with respect to the build direction 375. For example, the non-orthogonal angle or orientation can provide for shorter overhangs 344 that can reduce internal stresses during the build process.

Figure 6:
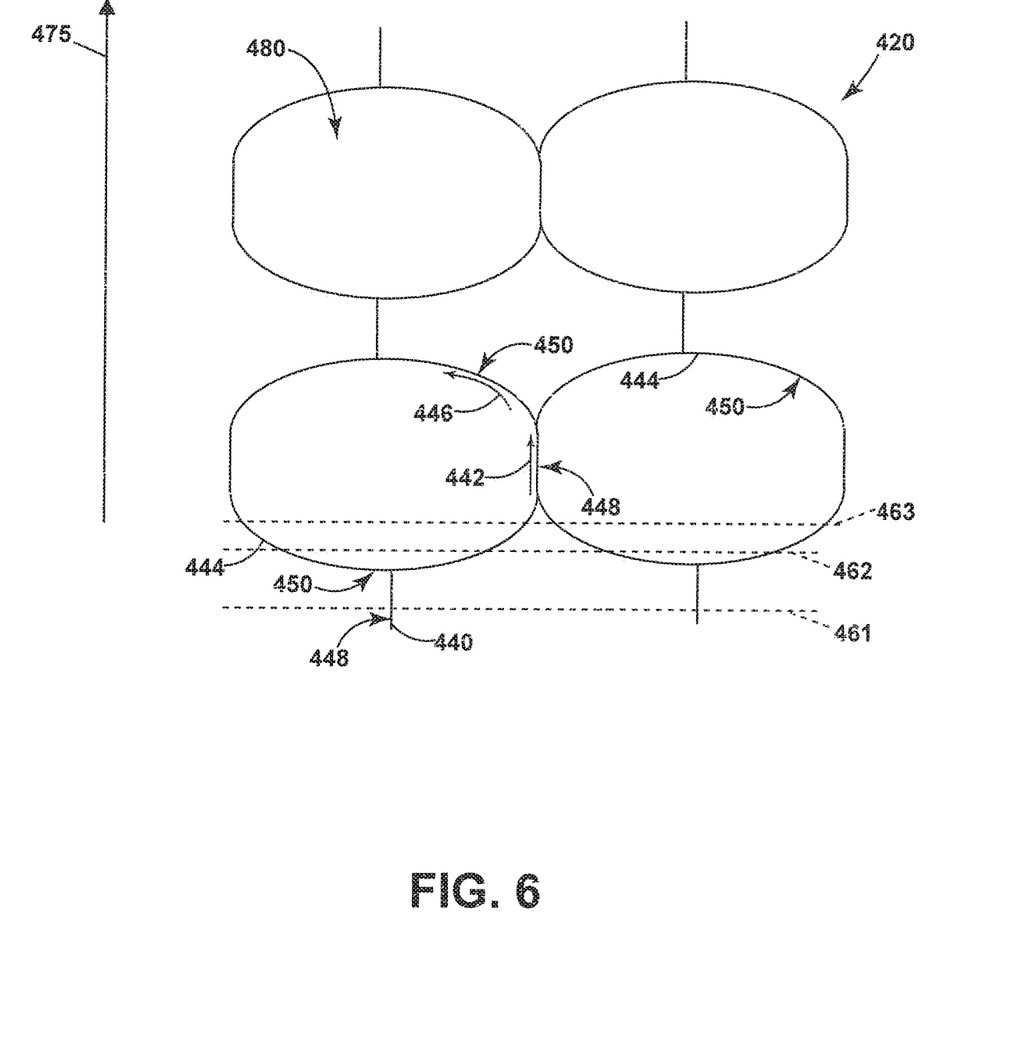
FIG. 6 is a schematic front view of another plexus with a curved geometric profile that can be utilized in the turbine engine component of FIG. 1

FIG. 6 schematically illustrates another plexus 420 that can be utilized in the airfoil 100, where the airfoil 100 is omitted for clarity. The plexus 420 is similar to the plexus 120, 220, 320; therefore, like parts will be identified with like numerals further increased by 100, with it being understood that the description of the like parts of the plexus 120, 220, 320 applies to the plexus 420, except where noted.

It should be understood that although illustrated with lines representing fluid passages, the plexus 420 represents a three-dimensional void within the airfoil 100 (FIG. 3). A column 440 defines a first fluid passage 448 extending along a first direction 442 which is parallel to a build direction 475. An overhang 444 defines a second fluid passage 450 extending along a second direction 446.

One difference is that the overhang 444 can be curved such that the second direction 446 is nonlinear, such that the fluid passages 448, 450 can define an ovate geometric profile 480. Optionally, linear columns 440 can be coupled between curved overhangs 444 that are offset from each other in the build direction 475. In an alternate example (not shown), curved overhangs can be directly coupled along the build direction.

The overhangs 344 can be built as an arc over multiple layers, illustrated with a first layer 461, a second layer 462, and a third layer 463 built up in the build direction 375. It can be appreciated that a benefit of the ovate geometric profile 480 is that internal stresses within the overhangs 444 can be reduced due to its non-orthogonal orientation with respect to the build direction 475, and that the curved overhangs 444 can distribute stresses in a continuous manner throughout the entire overhang wall 444 without discrete junctions between adjacent columns 440.

In still another example (not shown), additional fluid passages can be formed along a third direction unaligned with the first and second directions. For example, a first group of overhangs in the plexus can be formed perpendicular to the columns, while a second group of overhangs in the plexus can be formed at an acute angle with reference to the columns. The resulting geometry formed by the fluid passages can have a varied, asymmetric, or irregular geometric profile within the plexus.

Figure 7:
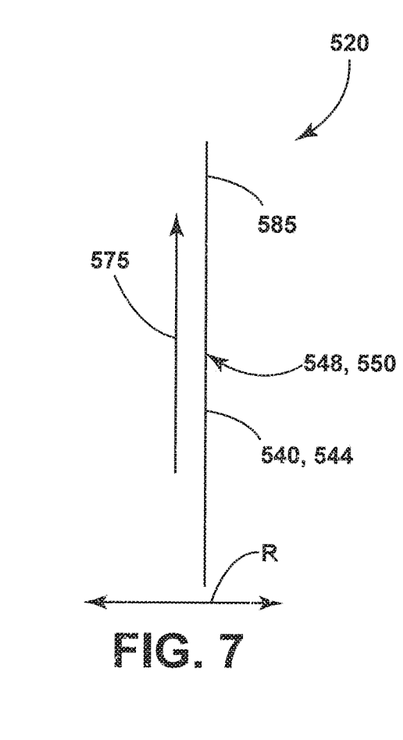
FIG. 7 is a schematic side view of another plexus with a linear geometric profile that can be utilized in the turbine engine component of FIG. 1.

FIG. 7 schematically illustrates another plexus 520 that can be utilized in the airfoil 100, where the airfoil 100 is omitted for clarity. The plexus 520 is similar to the plexus 120, 220, 320, 420; therefore, like parts will be identified with like numerals further increased by 100, with it being understood that the description of the like parts of the plexus 120, 220, 320, 420 applies to the plexus 520, except where noted.

It should be understood that although illustrated with lines representing fluid passages, the plexus 520 represents a three-dimensional void within the airfoil 100 (FIG. 3). The cross-wise direction R is illustrated for reference, and it should be understood that the plexus 520 can be oriented in any direction including the span-wise direction S, chord-wise direction C, or any combination of the above.

In addition, the plexus 520 is illustrated in an "edge-on" view. Columns 540 and overhangs 544 define respective first fluid passages 548 and second fluid passages 550. It is contemplated that the first and second fluid passages 548, 550 can define an effective surface 585 for the plexus 520. In the example of FIG. 7, the effective surface 585 is planar and aligns with the build direction 575. When viewed from the edge-on perspective of FIG. 7, the columns 540, overhangs 544, and fluid passages 548, 550 visually overlap and are represented by a single line which is oriented along the build direction 575.

Figure 8:
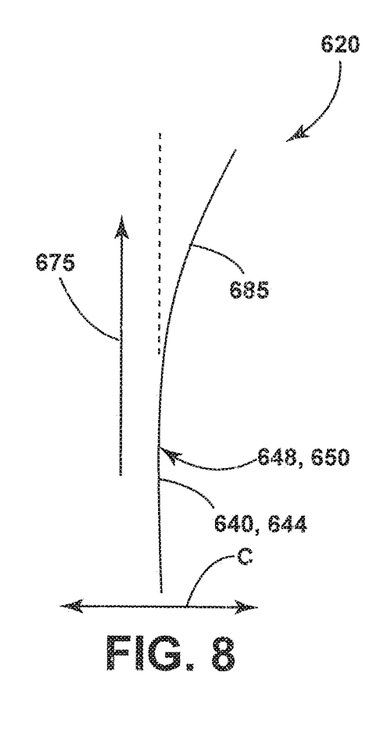
FIG. 8 is a schematic side view of another plexus with a geometric profile with a single curve that can be utilized in the turbine engine component of FIG. 1.

FIG. 8 schematically illustrates another plexus 620 that can be utilized in the airfoil 100, where the airfoil 100 is omitted for clarity. The plexus 620 is similar to the plexus 120, 220, 320, 420, 520; therefore, like parts will be identified with like numerals further increased by 100, with it being understood that the description of the like parts of the plexus 120, 220, 320, 420, 520 applies to the plexus 620, except where noted.

It should be understood that although illustrated with lines representing fluid passages, the plexus 620 represents a three-dimensional void within the airfoil 100 (FIG. 3). The chord-wise direction C is illustrated for reference, and it should be understood that the plexus 620 can be oriented in any direction including the span-wise direction S, cross-wise direction R, or any combination of the above.

The plexus 620 is illustrated in an "edge-on" view. Columns 640 and overhangs 644 define respective first fluid passages 648 and second fluid passages 650. The fluid passages 648, 650 can define an effective surface 685 for the plexus 620. In this edge-on perspective, the columns 640, overhangs 644, and fluid passages 648, 650 visually overlap and are represented by a single line. One difference is that at least a portion of the effective surface can be curved; in the example shown, the effective surface 685 is curved in the chord-wise direction C. It is contemplated that the effective surface can have any form of curvature over any portion or the entirety of the plexus 620. The effective surface can also include a constant or varying radius of curvature.

Figure 9:
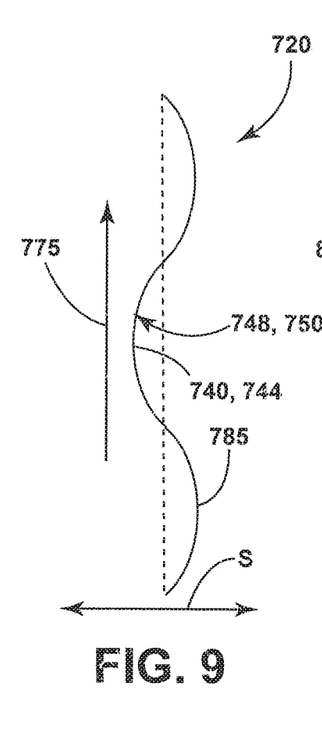
FIG. 9 is a schematic side view of another plexus with an S-shaped geometric profile that can be utilized in the turbine engine component of FIG. 1.

FIG. 9 schematically illustrates another plexus 720 that can be utilized in the airfoil 100, where the airfoil 100 is omitted for clarity. The plexus 720 is similar to the plexus 120, 220, 320, 420, 520, 620; therefore, like parts will be identified with like numerals further increased by 100, with it being understood that the description of the like parts of the plexus 120, 220, 320, 420, 520, 620 applies to the plexus 720, except where noted.

It should be understood that although illustrated with lines representing fluid passages, the plexus 720 represents a three-dimensional void within the airfoil 100 (FIG. 3). The span-wise direction S is illustrated for reference, and it should be understood that the plexus 720 can be oriented in any direction including the chord-wise direction C, cross-wise direction R, or any combination of the above.

The plexus 720 is illustrated in an "edge-on" view. Columns 740 and overhangs 744 define respective first fluid passages 748 and second fluid passages 750. The fluid passages 748, 750 can define an effective surface 785 for the plexus 720. In this edge-on perspective, the columns 740, overhangs 744, and fluid passages 748, 750 visually overlap and are represented by a single line.

One difference is that the effective surface 785 includes at least one S-shape, and is illustrated with a series of esses curving back and forth in the span-wise direction S. It is contemplated that the esses can have identical radii of curvature, or alternating esses can have alternating radii of curvature such as "long-short-long," or any suitable geometric arrangement of curved S-shapes can be formed by the effective surface 785.

Figure 10:
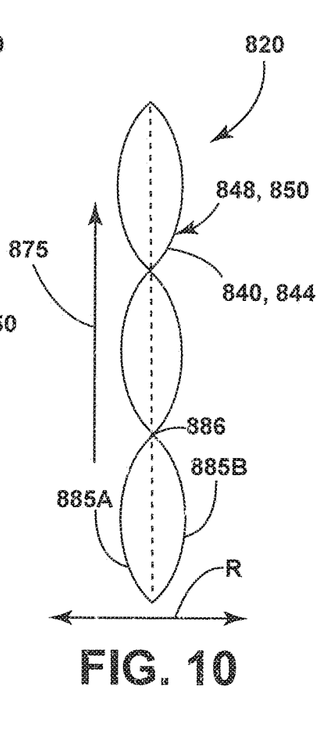
FIG. 10 is a schematic side view of another plexus with a geometric profile with multiple S-shapes that can be utilized in the turbine engine component of FIG. 1.

FIG. 10 schematically illustrates another plexus 820 that can be utilized in the airfoil 100, where the airfoil 100 is omitted for clarity. The plexus 820 is similar to the plexus 120, 220, 320, 420, 520, 620, 720; therefore, like parts will be identified with like numerals further increased by 100, with it being understood that the description of the like parts of the plexus 120, 220, 320, 420, 520, 620, 720 applies to the plexus 820, except where noted.

It should be understood that although illustrated with lines representing fluid passages, the plexus 820 represents a three-dimensional void within the airfoil 100 (FIG. 3). The cross-wise direction R is illustrated for reference, and it should be understood that the plexus 820 can be oriented in any direction including the chord-wise direction C, span-wise direction S, or any combination of the above.

The plexus 820 is illustrated in an "edge-on" view. Columns 840 and overhangs 844 define respective first fluid passages 848 and second fluid passages 850. One difference is that the fluid passages 848, 850 can define multiple effective surfaces for the plexus 820, illustrated with a first effective surface 885A and a second effective surface 885B for the plexus 820. In this edge-on perspective, the columns 840, overhangs 844, and fluid passages 848, 850 visually overlap and are represented by two solid lines.

The first and second effective surfaces 885A, 885B form a series of locally and oppositely spaced esses, and are illustrated as curving back and forth in the cross-wise direction R. The first effective surface 885A can have an opposite overall curvature compared to the second effective surface 885B, such that they share common points of contact formed by intersections 886 between the first and second effective surfaces 885A, 885B.

Figure 11:
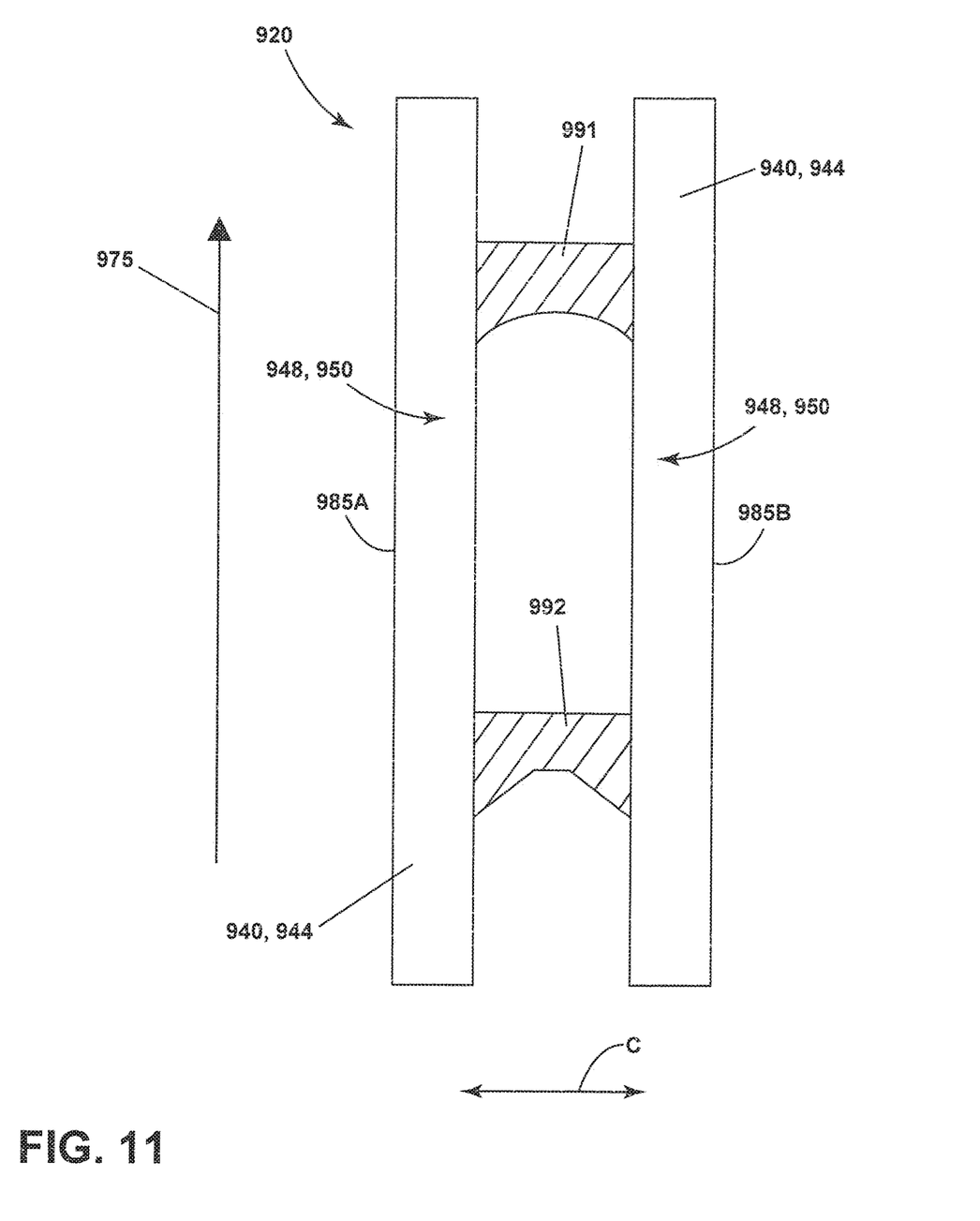
FIG. 11 is a cross-sectional side view of another plexus with column passages forming walls and overhang passages forming pins.

FIG. 11 schematically illustrates another plexus 920 that can be utilized in the airfoil 100, where the airfoil 100 is omitted for clarity. The plexus 920 is similar to the plexus 120, 220, 320, 420, 520, 620, 720, 820; therefore, like parts will be identified with like numerals further increased by 100, with it being understood that the description of the like parts of the plexus 120, 220, 320, 420, 520, 620, 720, 820 applies to the plexus 920, except where noted.

The plexus 920 represents a three-dimensional void within the airfoil 100 (FIG. 3). The chord-wise direction C is illustrated for reference, and it should be understood that the plexus 920 can be oriented in any direction including the span-wise direction S, cross-wise direction R, or any combination of the above.

The plexus 920 is illustrated in an "edge-on" view. Columns 940 and overhangs 944 define respective first fluid passages 948 and second fluid passages 950. The fluid passages 948, 950 define a first effective surface 985A and a second effective surface 985B for the plexus 920. In this edge-on perspective, the columns 940, overhangs 944, and fluid passages 948, 950 visually overlap and are represented by two solid lines.

One difference is that the first and second effective surfaces 985A, 985B can be connected by a structure in a direction unaligned with the surfaces 985A, 985B. In the illustrated example, a first structure 991 defines a pin with a curved lower surface, and a second structure 992 defines a pin with a beveled lower surface. The structures 991, 992 can be symmetric or asymmetric, and can include linear or nonlinear upper or lower surfaces connecting adjacent walls of the effective surfaces 985A, 985B to improve buildability. The structures 991, 992 can provide additional rigidity for the plexus 920 between adjacent effective surfaces 985A, 985B. In addition, while the structures 991, 992 are illustrated as solid in cross-section, it is also contemplated that either of the first or second structures can be hollow. In such a case, the first or second structures can optionally form additional fluid passages within the plexus 920. In still another example, the first or second structures can be utilized to couple the plexus 920 to another cooling passage or plenum (not shown) within the airfoil 100 (FIG. 3), including for structural stability or for fluid coupling in an example wherein a hollow first or second structure is provided.

Figure 12:
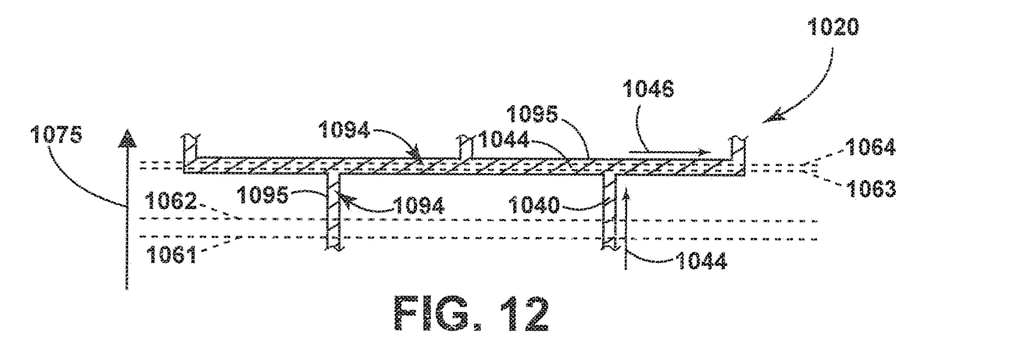
FIG. 12 is a cross-sectional front view of another plexus with a sacrificial core that can be utilized in the turbine engine component of FIG. 1.

Turning to FIG. 12, another plexus 1020 is schematically illustrated that can be utilized in the airfoil 100, where the airfoil 100 is omitted for clarity. The plexus 1020 is similar to the plexus 120, 220, 320, 420, 520, 620, 720, 820, 920; therefore, like parts will be identified with like numerals further increased by 100, with it being understood that the description of the like parts of the plexus 120, 220, 320, 420, 520, 620, 720, 820, 920 applies to the plexus 1020, except where noted.

The plexus 1020 can include columns 1040 extending along a first direction 1042 and overhangs 1044 extending along a second direction 1046. One difference is that the plexus 1020, including the columns 1040 or overhangs 1044, can define at least one precursor passage 1094 having a sacrificial core 1095. In one non-limiting example, the sacrificial core 1095 can include ceramic, including that which can be utilized in a ceramic layering process or a ceramic printing process. As shown, all of the columns 1040 and overhangs 1044 define precursor passages 1094 with solid sacrificial cores 1095. While illustrated as being "flat," the columns 1040 and overhangs 1044 can form three-dimensional structures and thicknesses as described above.

It is contemplated that the sacrificial core 1095 can be formed by additive manufacturing, including by serially printing, fusing, or stacking of material to form layers. A first layer 1061 and a second layer 1062 illustrates that the columns can be formed by serially forming layers of material along the build direction 1075. The overhangs 1044 can be supported by the columns 1040 during the build process, including serially forming layers of material to form the overhangs 1044 in a line as shown.

Figure 13:
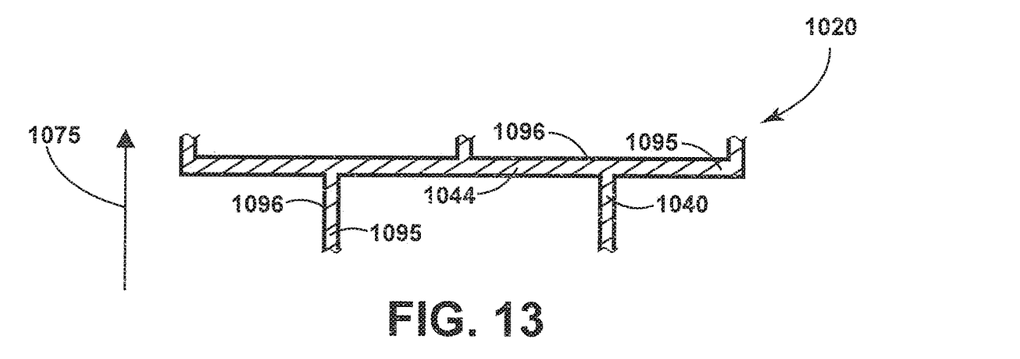
FIG. 13 is a cross-sectional front view of the plexus of FIG. 12 with a metal layer over the sacrificial core.

FIG. 13 illustrates that a metal layer 1096 can be formed over the precursor passages 1094, including over any or all exterior surfaces of the sacrificial cores 1095 forming columns 1040 and overhangs 1044. For example, the metal layer 1096 can completely surround the precursor passages 1094. The metal layer 1096 can have any suitable thickness and any suitable manufacturing method can be utilized to form the metal layer 1096, including casting or electrodeposition in non-limiting examples.

Figure 14:
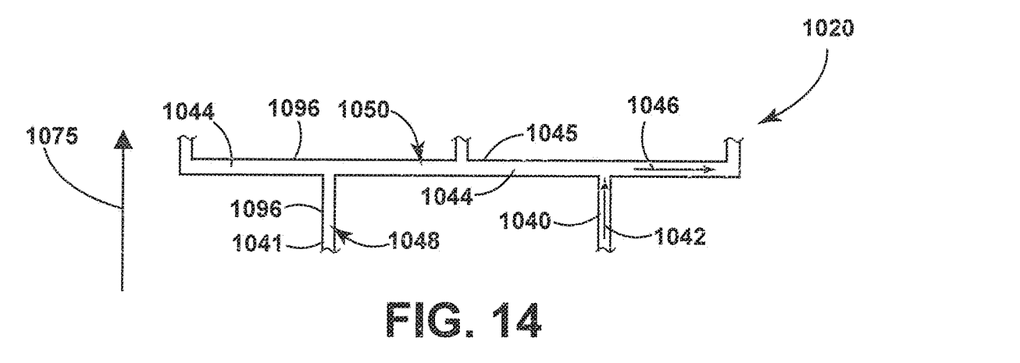
FIG. 14 is a cross-sectional front view of the plexus of FIG. 13 after removal of the sacrificial core.

FIG. 14 illustrates that the sacrificial cores 1095 can be removed from the precursor passages 1094. In non-limiting examples, the sacrificial cores can be removed via application of heat, a chemical flush, physical removal, or combinations thereof. After removal, the metal layer 1096 can form a hollow column wall 1041 for each column 1040 to define a first fluid passage 1048. The metal layer 1096 can also form a hollow overhang wall 1045 for each overhang 1044 to define a second fluid passages 1048, 1050. In this manner, the columns 1040 and overhangs 1044 can define respective first and second fluid passages 1048, 1050.

Figure 15:
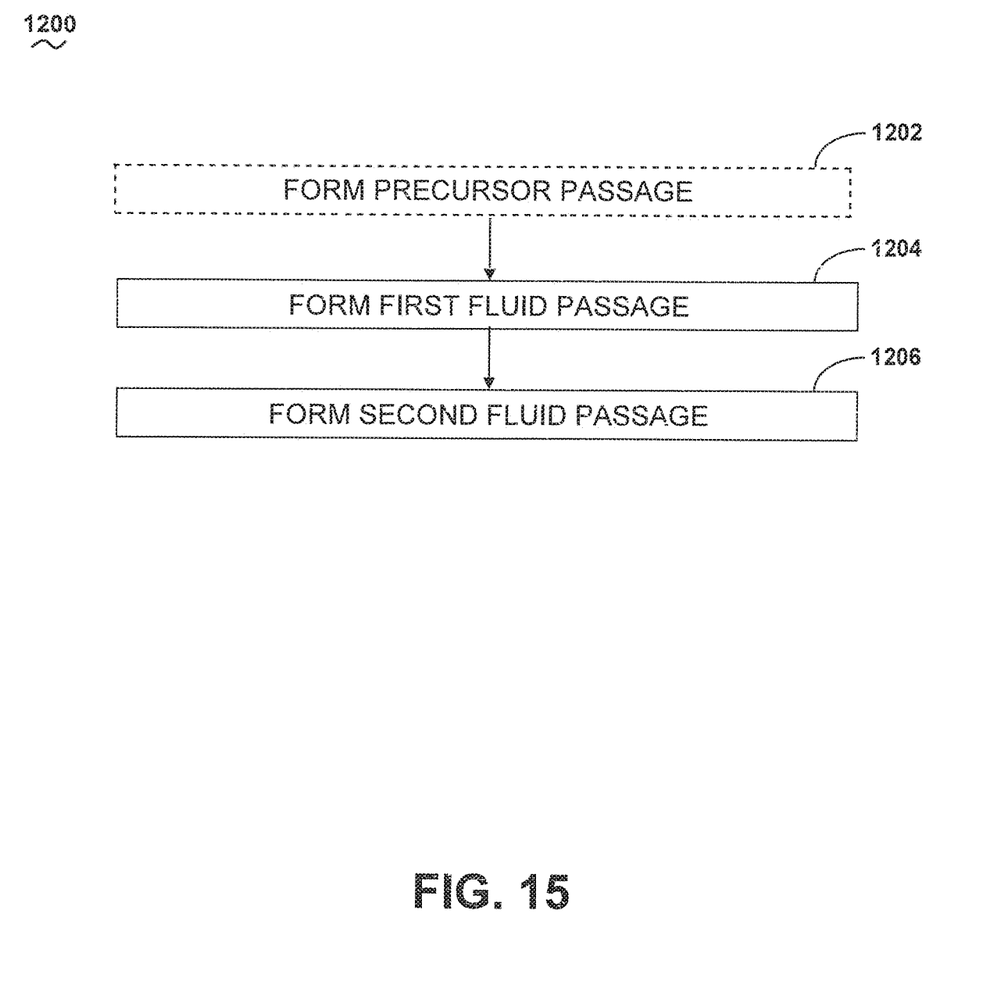
FIG. 15 is a flowchart illustrating a method of forming a plexus.

Turning to FIG. 15, a flowchart illustrates a method 1200 of forming a plexus, such as the plexus 120, 220, 320, 420, 520, 620, 720, 820, 920, 1020, within an additively-manufactured component such as the airfoil 100. It will be understood that that the method steps described below can be performed in any order.

Optionally, the method 1200 can include at 1202 forming a precursor passage as described above. The method 1200 can include forming a first fluid passage in the plexus at 1204. Forming the first fluid passage can include serially forming layers of material along a build direction to form a column defining the first fluid passage along a first direction within the interior of the airfoil. The first direction can be parallel to the build direction as described above. The method 1200 can also include forming a second fluid passage in the plexus at 1206 by serially forming layers of material along the build direction to form an overhang intersecting the column. The overhang can define the second fluid passage along a second direction within the interior of the component. The method can include simultaneously forming the first and second fluid passages, including simultaneously forming the first and second fluid passages along unaligned first and second directions. The method can further include repeatedly forming first and second fluid passages to form the plexus having multiple fluidly-connected passages as described above. The method can also include forming the multiple passages to have any suitable geometric profile, including rectangular, polygonal, hexagonal, ovate, asymmetric, irregular, curved, S-shaped, or linear, in non-limiting examples. It is also contemplated that the multiple passages in the plexus can have a curvature in multiple planes or dimensions simultaneously, such as an S-shaped curvature when viewed along the span-wise direction S and a C-shaped curvature when viewed along the chord-wise direction C, in one non-limiting example. The curvature can be utilized in any desired portion of the plexus or component therein, such as near the root of the airfoil adjacent a fillet, or near an inner band or an outer band of a vane, in non-limiting examples.

Benefits of the above described aspects include improving the producibility of an additively-manufactured component having a plexus. For example, an overhang formed orthogonally to a column can have a limitation on its maximum length or span between adjacent columns due to gravitational forces on the overhang wall, wherein exceeding the maximum length can cause undesirable warping or unsuccessful layering during an additive manufacturing process. The use of curved, angled, or non-orthogonal overhangs provides for shorter laterally-offset passages and builds up the overhang wall over a greater number of layers compared to orthogonal overhangs, which reduces internal stresses in the passage walls and improves stability of the component at least during manufacture. The use of a curved effective surface or structures such as pins as described above, or any combination thereof, provides for increased rigidity or stability as compared to a flat or planar arrangement of cooling passages having no additional structural supports. In addition, structural supports such as pins can provide for increased passage length by supporting a wall during its buildup over multiple layers, as compared to wall span limitations that may exist in designs not utilizing such structural supports. Aspects of the three-dimensional plexuses described herein provide for closely following multiple contours within the airfoil, enabling weight reductions, manufacturability improvements, and improved cooling to tailored locations.

It should be understood that application of the disclosed design is not limited to turbine engines with fan and booster sections, but is applicable to turbojets and turboshaft engines as well.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of forming a plexus within an additively-manufactured component, the method comprising:
    forming a first fluid passage in the plexus by serially adding layers of material along a build direction to form a column defining the first fluid passage along a first direction within an interior of a turbine engine component, the first direction being parallel to the build direction; and
    forming a second fluid passage in the plexus by serially adding layers of material along the build direction to form an overhang intersecting the column and defining the second fluid passage along a second direction within the interior, with the second fluid passage fluidly coupled to the first fluid passage;
    wherein at least one of the column or the overhang comprises a hollow wall defining the corresponding first fluid passage or second fluid passage.

2. The method of claim 1, wherein the first fluid passage and the second fluid passage define an effective surface for the plexus.

3. The method of claim 1 wherein the forming a second fluid passage comprises forming the overhang as at least one of an arc or a line over multiple layers.

4. The method of claim 1 wherein the plexus comprises a set of fluid passages including the first fluid passage and the second fluid passage and forming a geometric profile that is identical throughout the plexus.

5. The method of claim 1 wherein the plexus comprises a set of fluid passages including the first fluid passage and the second fluid passage and forming a geometric profile that is at least one of ovate or polygonal.

6. The method of claim 1 wherein the plexus comprises a set of fluid passages including that first fluid passage and the second fluid passage, with the set of fluid passages arranged in rows that are orthogonal to the build direction.

7. The method of claim 2 wherein the effective surface is nonlinear.

8. The method of claim 2 wherein the effective surface defines at least one S-shape.

9. The method of claim 8 wherein the at least one S-shape comprises a series of locally and oppositely spaced esses.

10. The method of claim 1 further comprising simultaneously forming the first fluid passage and the second fluid passage.

11. The method of claim 2 further comprising simultaneously forming the first fluid passage and forming the second fluid passage.

12. The method of claim 1 further comprising forming a precursor passage including a sacrificial core.

13. The method of claim 12 further comprising forming a metal layer over the sacrificial core and removing the sacrificial core to define at least one of the first fluid passage or the second fluid passage.

14. A method of forming a plexus within an additively-manufactured component, the method comprising:
    forming a sacrificial core by serially adding layers of material along a build direction to form a column extending along the build direction, with the column at least partially defining a first fluid passage, and serially adding layers of material along the build direction to form an overhang extending along a second direction and intersecting the column, with the overhang at least partially defining a second fluid passage fluidly coupled to the first fluid passage, wherein at least one of the column or the overhang comprises a hollow wall;
    forming a metal layer over the sacrificial core; and
    removing the sacrificial core to form the plexus.

15. The method of claim 14, further comprising forming the overhang as at least one of an arc or a line over multiple layers.

* * * * *